(12) United States Patent
Grela et al.

(10) Patent No.: US 8,056,995 B2
(45) Date of Patent: Nov. 15, 2011

(54) TOOLBOX ASSEMBLY

(75) Inventors: Larry Mitchell Grela, Plainfield, IL (US); Edwin Dizon Manalang, Burbank, IL (US)

(73) Assignee: Larry Mitchell Grela, Plainfield, IL (US)

( * ) Notice: Subject to any disclaimer, the term of this patent is extended or adjusted under 35 U.S.C. 154(b) by 0 days.

(21) Appl. No.: 12/803,801

(22) Filed: Jul. 7, 2010

(65) Prior Publication Data
US 2010/0276317 A1   Nov. 4, 2010

Related U.S. Application Data

(63) Continuation of application No. 11/726,127, filed on Mar. 21, 2007, now Pat. No. 7,784,887.

(51) Int. Cl.
*A47B 88/00* (2006.01)
(52) U.S. Cl. .................. 312/348.4; 312/330.1
(58) Field of Classification Search .............. 312/257.1, 312/263, 294, 330.1, 348.1, 348.2, 348.3, 312/348.4, 351, 332.1; 220/558
See application file for complete search history.

(56) References Cited

U.S. PATENT DOCUMENTS

| | | |
|---|---|---|
| 425,215 A | 4/1890 | Franklin |
| 652,778 A | 7/1900 | James |
| 898,106 A | 9/1908 | Higgins |
| 1,113,832 A | 8/1914 | Roth |
| 1,172,189 A * | 2/1916 | Bauer .................. 312/348.4 |
| 1,222,451 A * | 4/1917 | Ohnstrand ............ 312/348.4 |
| 1,352,002 A * | 9/1920 | Jones .................... 312/348.2 |
| 1,414,826 A | 5/1922 | Meyerson |
| 1,514,885 A | 3/1924 | Bigler |
| 1,510,240 A | 9/1924 | Carrier |
| 1,984,345 A | 12/1934 | Kennedy |
| 1,987,822 A | 1/1935 | Gregory |
| 2,286,427 A | 6/1942 | Levensten |
| 2,525,208 A | 9/1946 | Clink |
| 2,880,918 A | 4/1959 | Schweikhard |
| 2,996,192 A | 12/1959 | Dell et al. |
| 2,995,256 A | 8/1961 | Schoenfisch |
| 3,024,075 A * | 3/1962 | Howe ..................... 312/348.4 |
| 3,092,428 A | 6/1963 | Kerschner |
| 3,179,480 A * | 4/1965 | Brinker ................. 312/348.4 |
| 3,259,230 A | 7/1966 | Jaeger |
| 3,520,583 A | 7/1970 | Case |
| 3,558,205 A | 1/1971 | Mueller |
| 3,848,942 A | 11/1974 | Fanini |
| 3,954,202 A | 5/1976 | Petrick |
| 4,058,210 A | 11/1977 | Mitchell |
| 4,108,514 A | 8/1978 | Zimmerman |
| 4,211,455 A | 7/1980 | Tedrow |
| 4,266,835 A | 5/1981 | Schmidt |
| 4,303,158 A | 12/1981 | Perkins |
| 4,614,384 A | 9/1986 | Takano et al. |
| 4,733,703 A | 3/1988 | Cimino |
| 4,821,143 A | 4/1989 | Holmgren et al. |
| 5,456,531 A * | 10/1995 | Beals .................... 312/330.1 |
| 5,927,838 A * | 7/1999 | Hellman, Jr. .......... 312/257.1 |
| 5,951,129 A | 9/1999 | Stein |
| 5,951,133 A * | 9/1999 | Dittberner et al. ..... 312/348.4 |
| 6,422,386 B1 * | 7/2002 | Wiese et al. ............ 206/373 |

(Continued)

OTHER PUBLICATIONS

International Search Report for PCT Application No. PCT/US2010/001732—Aug. 19, 2010.

(Continued)

*Primary Examiner* — James O Hansen
(74) *Attorney, Agent, or Firm* — John Chupa

(57) ABSTRACT

A toolbox assembly 10 which is adapted to allow material to be easily and securely stored and retrieved and which is aesthetically pleasing and structurally sound.

6 Claims, 15 Drawing Sheets

U.S. PATENT DOCUMENTS

| | | | | |
|---|---|---|---|---|
| 6,666,533 B1* | 12/2003 | Stavros | ...................... | 312/348.3 |
| 7,296,808 B2 | 11/2007 | Huguet | | |
| 7,510,078 B2 | 3/2009 | Schmidt et al. | | |
| 2005/0204646 A1* | 9/2005 | Tupper et al. | .................. | 52/36.5 |
| 2006/0103278 A1* | 5/2006 | Bousquet | ................... | 312/332.1 |

OTHER PUBLICATIONS

Matco Tools Catalog at least as early as Feb. 6, 2009.
United States Trademark Registration No. 3,930,484.
Matco Tools Catalog at least as early as Jan. 1, 1996.

* cited by examiner

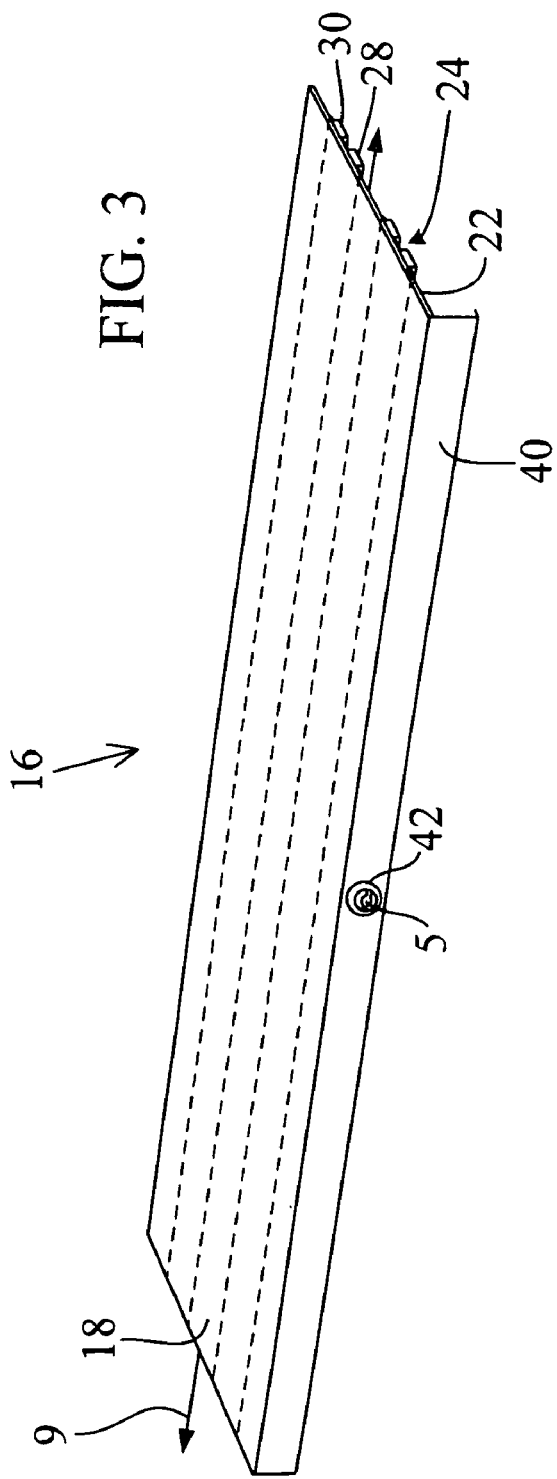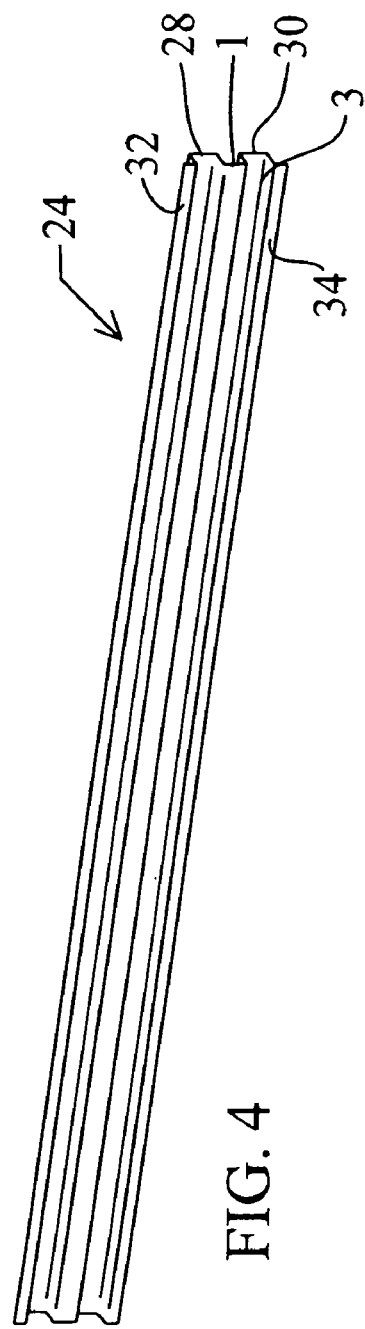

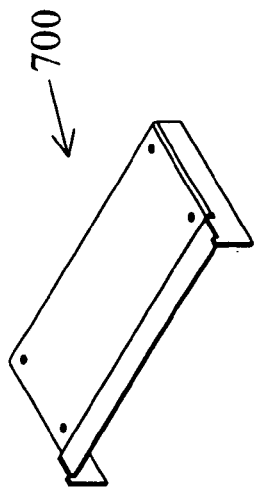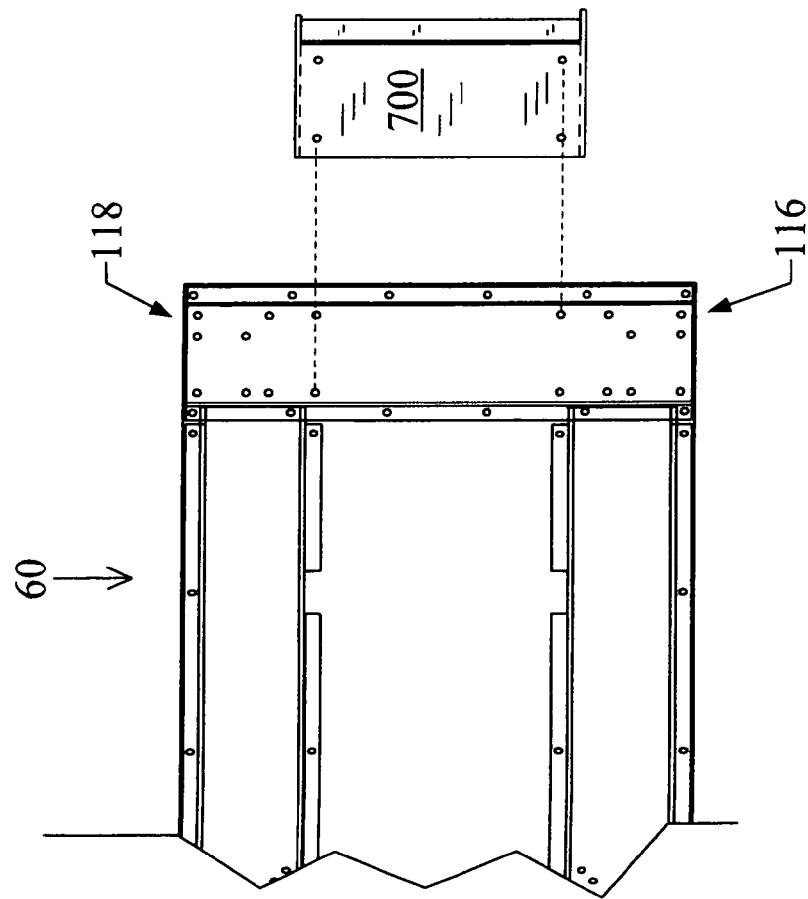

TOOLBOX ASSEMBLY

This application is a continuation of non-provisional application Ser. No. 11/726,127 which was filed on Mar. 21, 2007 now U.S. Pat. No. 7,784,887.

GENERAL BACKGROUND

1. Field of the Invention

The present invention generally relates to a toolbox assembly and more particularly to a toolbox assembly which is both aesthetically pleasing, which is sturdy, which is able to be easily locked, and which is highly functional and which allows items to be efficiently stored and accessed.

2. Background of the Invention

Toolbox assemblies are used to selectively store tools, such as automotive repair type tools, and other materials. While these assemblies do allow such tools and other materials to be stored and selectively retrieved, they suffer from several drawbacks.

By way of example and without limitation, many of these toolbox assemblies are not aesthetically pleasing and are not very sturdy. For example, many of these toolbox assemblies have unsightly weld type connections formed on several or all of the surfaces of the body and such connections undesirably disrupt the overall appearance of the assembly, and many of these toolbox assemblies bend or bow over time, due to the weight associated with the stored items and the fact that they are not structurally sturdy, and many of these toolbox assemblies even break.

Further, by way of example and without limitation, many of these toolbox assemblies are very difficult to lock or unlock, requiring a relatively large amount of strength to move the locking mechanism to the desired locked or unlocked position and these toolbox assemblies don't even allow the assembly to be locked unless all of the drawers are in a predetermined closed position. Thus, one cannot lock the toolbox assembly with one of the drawers in an open and utilized position.

This is a particular significant drawback because oftentimes the user of the toolbox assembly, after performing much work with the stored tools, forgets to lock the assembly, thereby making the contained tools available for theft. It would be highly beneficial if, before the work was begun, several drawers were opened (e.g., those containing the necessary tools) and the assembly locked. After the work was completed, the drawers, in this highly beneficial scenario, would simply be closed and automatically be placed in a locked position with the unopened and previously locked drawers. Unfortunately, this utility does not exist with current and prior toolbox assemblies.

Further, these prior and current toolbox assemblies do not allow desired casters to be utilized (e.g., larger or more sturdy casters for particularly heavy toolbox assemblies and lighter casters for lighter toolbox assemblies), thereby increasing the probability of breakage (i.e., if lighter type casters were only used and the contained tools were particularly heavy and/or the toolbox assembly was utilized in a particularly harsh environment, such as that in which a large amount of vibration or movement occurred) and undesirably increasing the cost if relatively expensive casters were used in a situation in which they were not needed (i.e., where the toolbox assembly is not relatively heavy and the environment is not really harsh). Further, these prior and current toolbox assemblies do not readily allow additional casters to be deployed if the need arises and in order to increase the sturdiness or ruggedness of the utilized toolbox assembly.

Yet further, these prior and current toolbox assemblies do not allow drawers to be readily interchangeable in order to accommodate different storage strategies or techniques of the various users of these toolbox assemblies and do not allow for differently shaped items to be readily stored within these assemblies.

The present inventions overcomes these and other drawbacks associated with current and prior toolbox assemblies in a new and useful manner.

SUMMARY OF THE INVENTIONS

It is a first non-limiting object of the present invention to provide a toolbox assembly which overcomes some or all of the previously delineated drawbacks and disadvantages of prior and current toolbox assemblies, such as by way of example and without limitation, those which are delineated above.

It is a second non-limiting object of the present invention to provide a toolbox assembly which is sturdy, aesthetically pleasing, allows a wide range of storage strategies and items to be utilized and has enhanced functionality.

According to a first non-limiting aspect of the present invention, a toolbox assembly is provided and includes at least one door including a trim member which is attached to the at least one door and which includes a generally C-shaped trim member which is adapted to reflect ambient light in an aesthetically pleasing manner.

According to a second non-limiting aspect of the present invention, a selectively lockable toolbox assembly is provided and which includes at least a first and a second door and a latch assembly which allows the toolbox assembly to be selectively locked when the at least said first door is open and which further allows the at least first door to be selectively moved to a closed position after the toolbox assembly has been selectively locked.

According to a third non-limiting aspect of the present invention, a toolbox assembly is provided and includes a body which includes a back wall portion; a plurality of locking members, wherein each of the plurality of locking members are deployed in a longitudinally coextensive manner upon the back wall portion and wherein each of the plurality of locking members includes a plurality of substantially identical apertures; a bar member which is coupled to each of the plurality of locking members; at least one spring member which is coupled to one of the plurality of locking members and to said bar member; a plurality of drawers, wherein each of the plurality of drawers includes at least one movable latch and wherein each of the movable latches are respectively and selectively deployed into a unique one of the substantially identical apertures; and a third member which is movably coupled to the back wall portion and which outwardly projects from the back wall portion along a direction which is perpendicular to the bar member and which includes a trough portion which abuts the bar member and wherein when the third member is moved to a first position the trough portion of the third member moves the bar member and the each of the plurality of locking members in an first upward direction which causes each of the latches to be prevented from being moved from the plurality of apertures and when the third member is moved to a second position the trough portion of the third member moves the bar member and each of the plurality of locking members in a second downward direction which causes each of the latched to be made capable of being selectively removed from the plurality of apertures and wherein the at least one spring member aids in moving the bar member and each of the plurality of locking members in the upward direction.

These and other features, aspects, and advantages associated with the present inventions will become apparent from a reading of the following detailed description of the preferred embodiment of the inventions, including the subjoined claims, and by reference to the following drawings.

BRIEF DESCRIPTION OF THE DRAWINGS

FIG. 3 is a partial perspective and unassembled view of the top panel portion of the toolbox assembly which is shown in FIGS. 1 and 2.

FIG. 4 is side view of top panel brace member which is shown in FIG. 3.

FIG. 18 is a perspective view of the side cabinet support bracket which forms a portion of the toolbox assembly which is shown in FIGS. 1,2, and 16.

FIG. 19 is an unassembled bottom view of the combination of a portion of the toolbox assembly which is shown in FIGS. 1, 2, and 16 in combination with the side cabinet support bracket which is shown in FIG. 18.

DETAILED DESCRIPTION OF THE PREFERRED EMBODIMENT OF THE INVENTIONS

Figure 1:
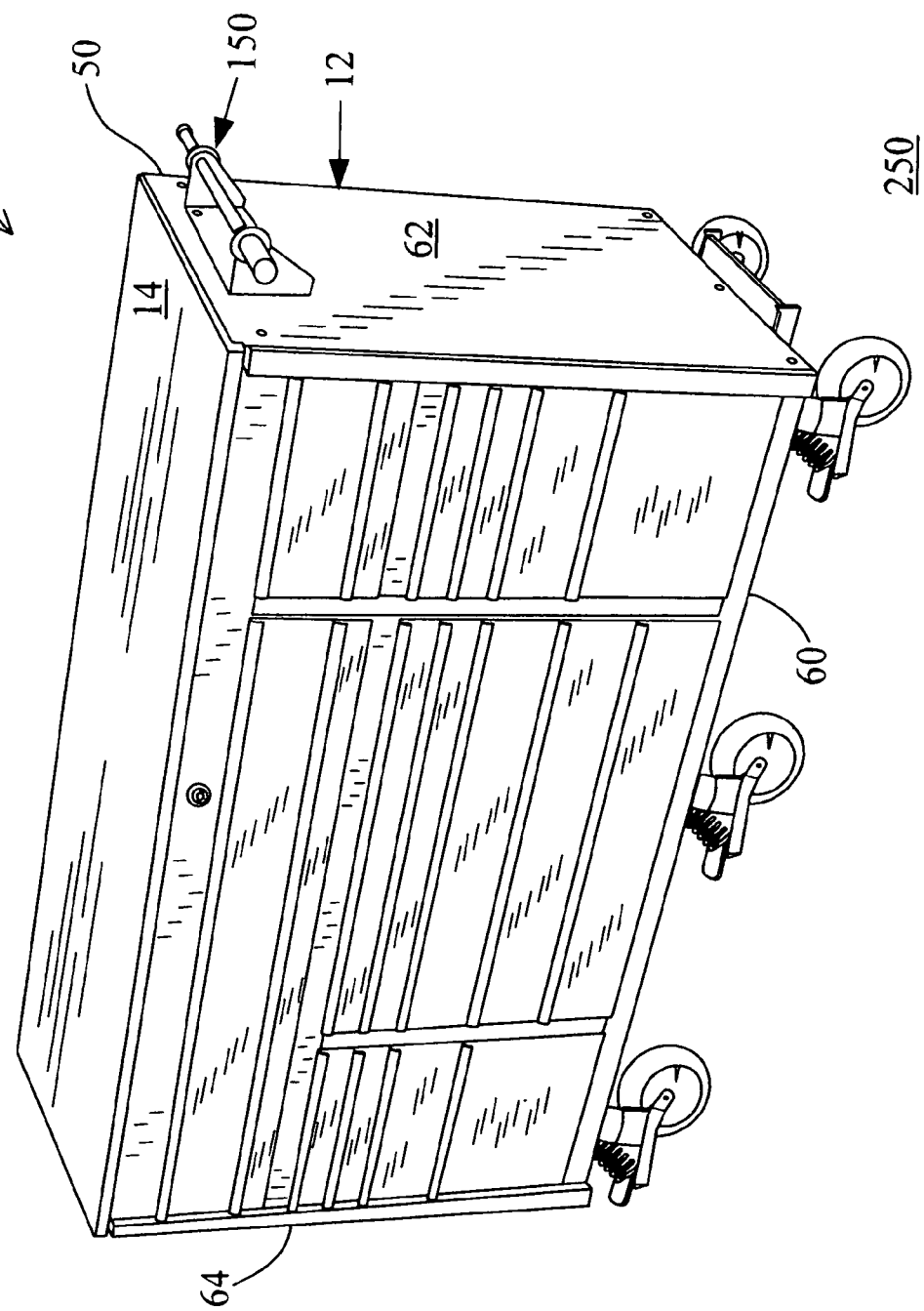
FIG. 1 is a perspective view of a toolbox assembly which is made in accordance with the teachings of the various embodiments of the inventions.
Figure 2:
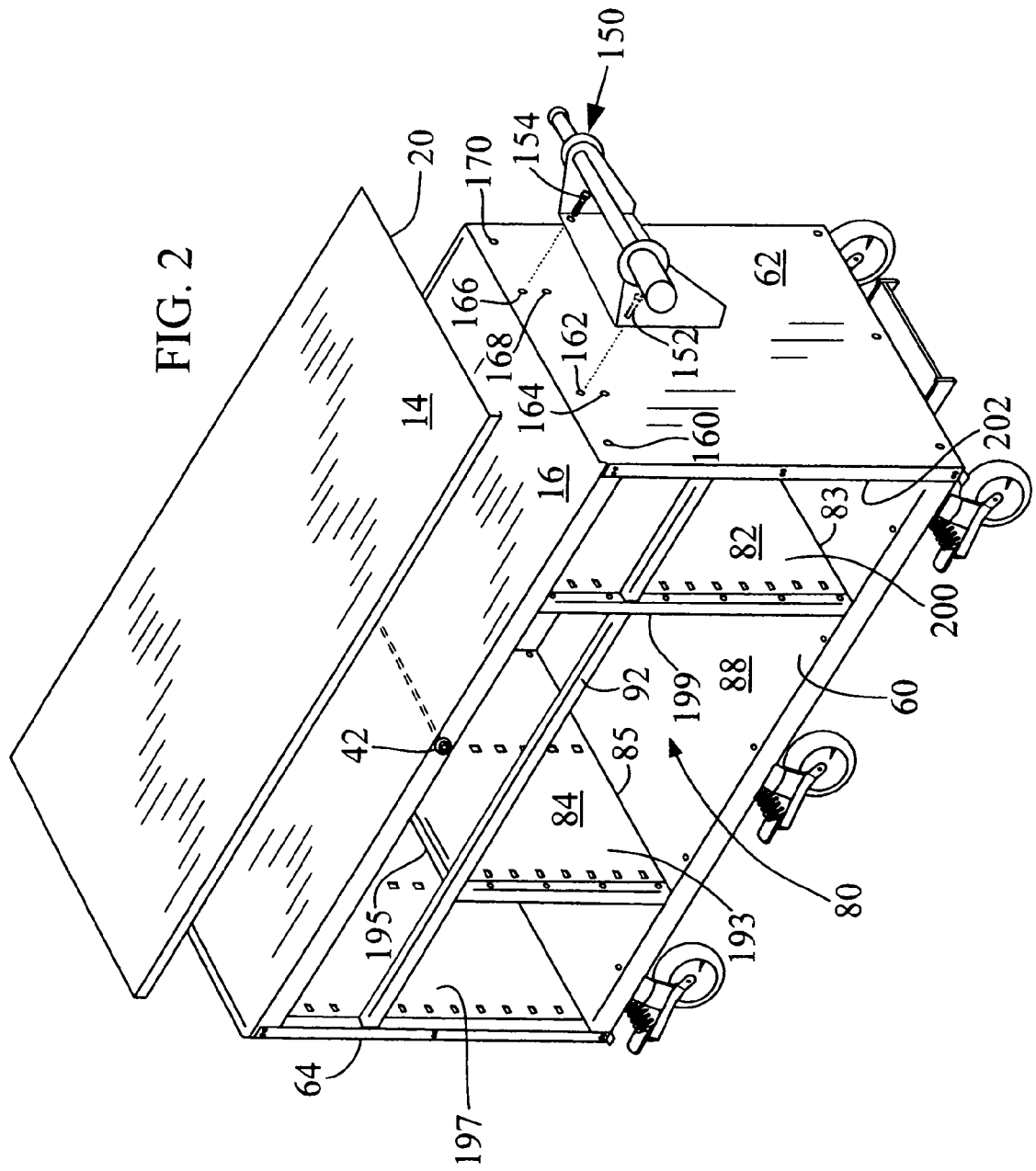
FIG. 2 is a partial perspective unassembled view of a portion of the toolbox assembly which is shown in FIG. 1.
Figure 5:
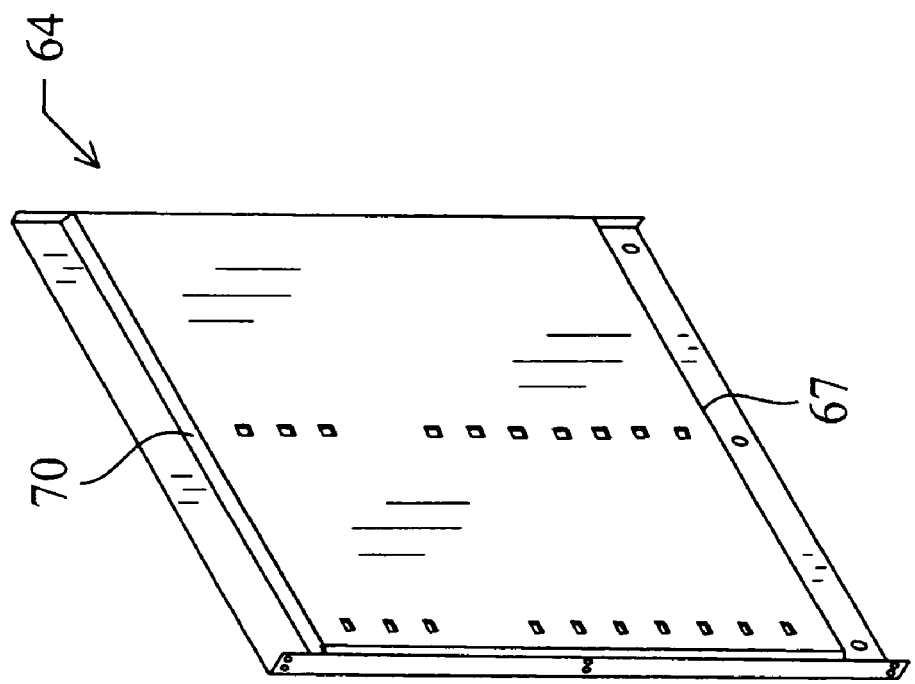
FIG. 5 is a perspective view of the right inner panel of the toolbox assembly which is shown in FIGS. 1 and 2.
Figure 6:
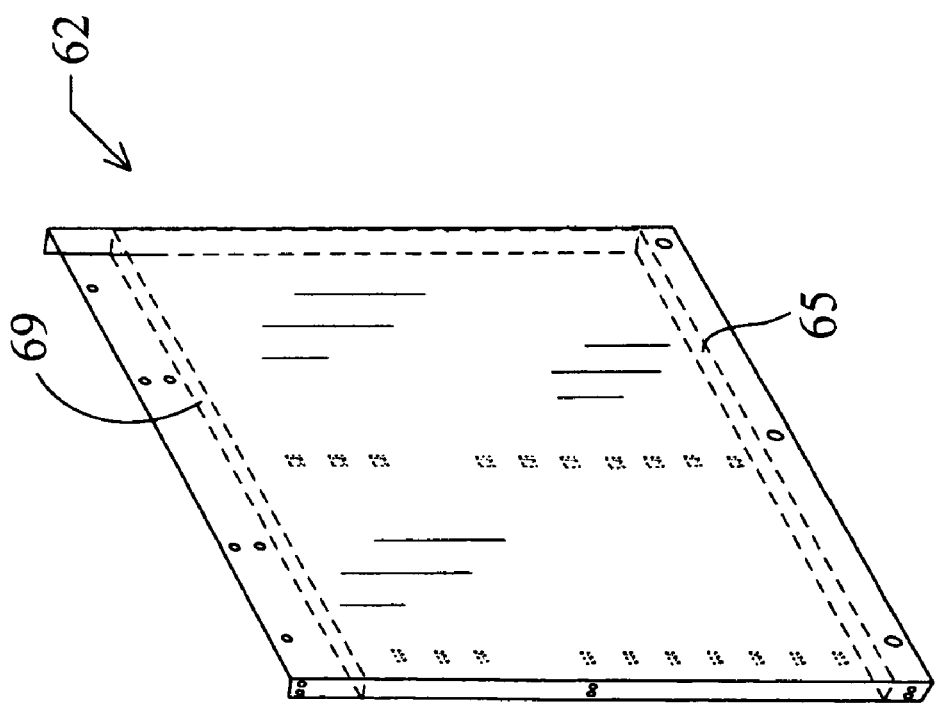
FIG. 6 is a perspective view of the left inner panel of the toolbox assembly which is shown in FIGS. 1 and 2.
Figure 16:
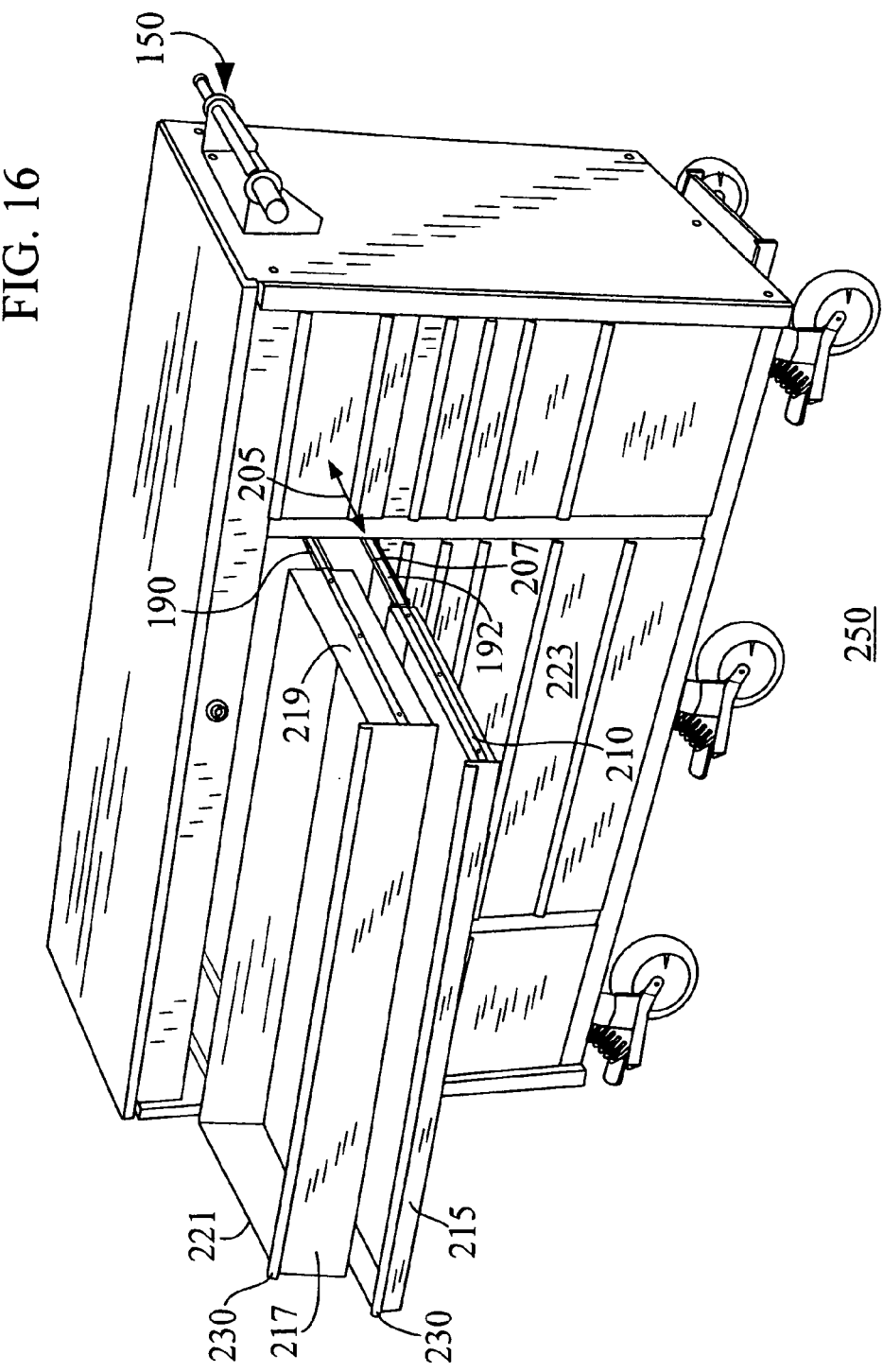
FIG. 16 is a view which is similar to that of FIG. 1 but which illustrates the selective movement of drawers to an open position and the drawer interchangeability strategy employed by the various embodiments of the invention.

Referring now to FIGS. 1, 2, and 16, there is shown a toolbox assembly 10 which is made in accordance with the teachings of the preferred embodiment of the various inventions. Particularly, the toolbox assembly 10 includes a generally hollow body 12 which is selectively formed by a plurality of members which will be discussed below and which is adapted, as is evident from the discussion below, to selectively and movably receive drawers which are themselves adapted to selectively receive and store tools and/or other items and which allows these received tools and/or other items to be efficiently accessed and then later deposited into the toolbox assembly for secure storage. Thus, it should be appreciated that while we are referring to the assembly 10 as a "toolbox" assembly, many dissimilar items, other than tools, may be selectively deposited, stored, and retrieved from the assembly 10.

The toolbox assembly 12 includes a stainless steel top member 14 and a top member support member 16, both of which are substantially planar and substantially similar in size, shape, and overall geometric configuration. The members 14, 16 may, of course, be constructed from a variety of dissimilar materials and nothing in this description limits the toolbox assembly 10 to only one or several specific types of materials. The top member 14 is attached to the support member 16 by substantially any desired connection strategy or technique, such as by rivets or other type of fasteners and/or a welded connection.

As is shown perhaps best in FIGS. 3 and 4, top panel support member 16 has a first generally planar surface 18 which selectively receives and which is selectively coupled to the generally planar interior surface or underside 20 of the top panel member 14, and an opposed and generally flat interior or bottom surface 22 upon which several substantially identical brace or structural support members 24 are attached. Particularly, each brace or structural support member 24, when attached to the surface 22, is linearly coextensive to the interior surface 22, is parallel to the axis of symmetry 9 of the interior surface 22 and comprises a pair of integrally connected or integrally formed trough members or portions 28, 30 which are joined along edge 1. Particularly, the member or portion 28 has a flat raised lip portion 32 which is coupled to the surface 22 by the use of a welded connection or some other type of fastener strategy or methodology. Portion 32 may be integrally formed with the portion 28. Similarly, the member or portion 30 has a raised flat lip portion 34 which is coupled to the surface 22 by the use of a welded connection or some other type of fastener methodology. Portion 34 may be integrally formed with the portion 30. The jointly shared edge 1 is also coupled to the surface 22 by the use of a welded connection or some other type of fastener methodology and edge 1 and lip portions 32, 34 are coplanar and lie in a plane which is parallel to the surface 18. The respective depressed portion 3 of each respective member 28, 30 forms a gap within member 16 and may be filled with foam material or made solid in other non-limiting embodiments. Thus, each support member 24 has an undulating surface, formed from raised edges 32, 34, 1 and trough portions 28, 30 which adhere to or abut the surface 22.

The brace members 24 structurally strengthen the support member 16, thereby cooperating with the support member 16 to provide enhanced structural support to the top member 14 and reducing the likelihood of structural degradation or damage when a large amount of weight is placed upon the member 14 or the toolbox assembly 10 is placed in a very harsh environment.

The top member support member 16 further includes a generally planar edge 40 which is linearly coextensive to the surfaces 18, 22 and which orthogonally projects from the surface 18 forming a "L-shape" with the surface 22 (i.e., the edge 40 forms a right angle with surface 18). The edge 40 includes a selectively movable locking mechanism 42 (e.g., the locking mechanism 42 includes a selectively "turnable" key receptacle portion 5 which, when a key (not shown) is inserted, causes the mechanism 42 (e.g., a conventional tumbler) to selectively move in a clockwise or counterclockwise direction. Particularly, as will be discussed later, the locking mechanism 42 (e.g., selectively turnable key reptacle or tumbler portion 5) is coupled to a bar 600 (see, for example, FIG. 8 which will be discussed more fully below) and which allows the later-explained deployed drawers to be selectively locked and unlocked.

The toolbox assembly 10 further includes a generally planar back panel 50 (shown perhaps best in FIG. 7) which is orthogonally coupled to the top member 14 along edge 52 (e.g., panel 50 forms a right angle with respect to top member 14) and such coupling may be achieved by the use of a welded type connection or substantially any other type of connection strategy or technique.

Further, as shown perhaps best in FIGS. 2, 5, 6, 17, and 20 the toolbox assembly 10 includes a generally planar bottom member 60 and generally planar and substantially identical end panels 62, 64 which are respectively coupled along respective edges 65, 67 to the bottom member 60 and which are respectively coupled along respective edges 69, 70 to the interior surface 22 of the top panel support member 16. In this manner, the members 50, 62, 64, 60, and 16 form a generally hollow body (e.g., forming a cavity 80) into which various items may be selectively deposited for secure storage and than later retrieved for use. It should be appreciated that such coupling may be achieved by the use of a welded connection, by rivets, or by any other type of fastener methodology or strategy. It should be appreciated that panels 62, 64 maybe powder coated and/or painted before being installed and that all other panels and components of the toolbox assembly 10 may be similarly painted and/or powder coated before being installed, thereby reducing the effort needed to construct the toolbox assembly 10 while providing a consistent finish and a pleasing overall aesthetic appearance. It should also be appreciated that such panel, such as panels 62, 64, 82, 84 may actually comprise two or more substantially identical panels which are selectively joined. The use of such multiple or "double" panels increases the structural integrity and strength of the assembly 10.

Within the formed cavity 80, there may selectively be placed a plurality of generally planar inner panels, such as inner panels 82, 84 which may be orthogonally coupled along respective edges 83, 85 to the top or exposed surface 88 of the bottom member 60 (i.e., panels 82, 84 each form a right angle with respect to the surface 88), and such a connection may be realized by the use of a welded connection or substantially any other type of desired connection strategy or methodology.

Further, inner panel 83 is orthogonally coupled to the bottom or interior surface 22 of the member 16 at or along edge 91 and such a coupling may be achieved by the use of a welded connection or some other type of fastener strategy or technique. Similarly, panel 84 is coupled to the interior surface 22 of the member 16 at edge 93 by the use of a welded connection or some other type of fastener or coupling methodology or strategy. That is, panels 83 and 84 each form a right angle with respect to the surface 22. It should be appreciated that any number of such inner panels may be utilized within the toolbox assembly 10 and that nothing limits the toolbox assembly 10 to a particular number of type of inner panels.

In one non-limiting embodiment, the connection of the interior panels 82, 84 within the cavity 80 is strengthened and made more rigid by the use of at least one bar 92 (e.g., a strengthening bar) which traverses the width of the cavity 80, which traverses the interior panels 82, 84, and which is coupled to and which terminates within the end panels 62, 64, thereby firmly securing the interior panels 82, 84 within the cavity 80. It should be appreciated that any number and type of interior bars, such as reinforcement bar 92, may be utilized within the cavity 80, and that nothing in this description is meant to limit the toolbox assembly 10 to the use of bar or member 92 or to any particular number and/or type of interior bars or member, such as bar or member 92.

Figure 7:
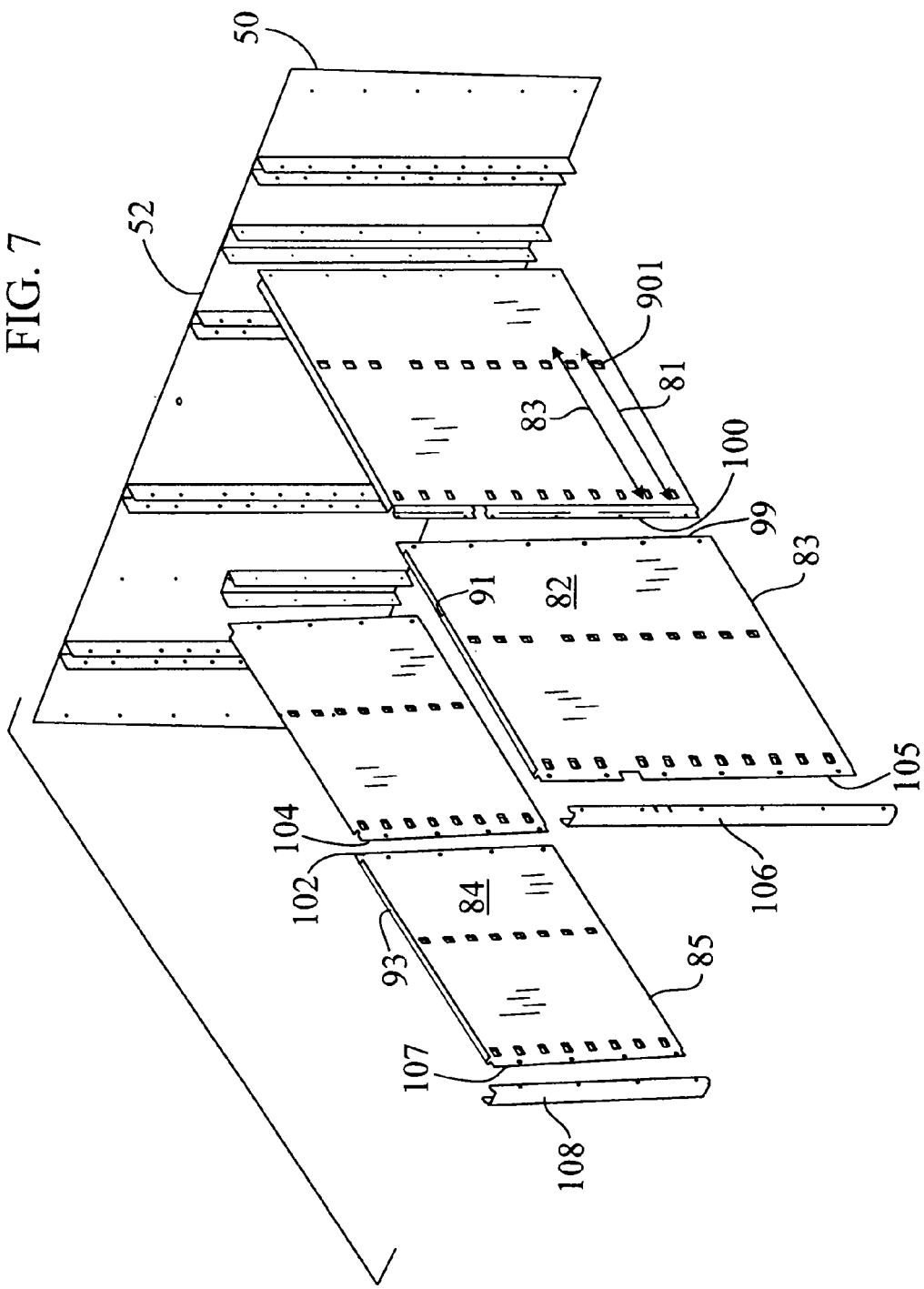
FIG. 7 is a partial perspective view of the back member in combination with various internal panels of the toolbox assembly which is shown in FIGS. 1 and 2.

Further, as best shown in FIG. 7, interior panel 83 and interior panel 84 may actually and respectively comprise two separate and, in one non-limiting embodiment, substantially identical panels (e.g., panel 82 may be formed by two panels which are joined along edges 99, 100 and panel 84 may be formed by two and, in one non-limiting embodiment, substantially identical panels which are joined along edges 102, 104). Further, in the most preferred embodiment of the invention, edge 105 of panel 82 is coupled to an aesthetically pleasing facia member 106 and such coupling may be achieved by the use of rivets or other types of coupling strategies and methodologies and edge 107 of the panel member 84 is similarly coupled to a facia member 108, and the facia members 106, 108 are substantially identical in one non-limiting embodiment of the invention. It should further be appreciated that each of the interior panels, such as panel 82, 84, may include a plurality of equally spaced and "preformed" apertures, such as aperture 79, which are used to receive a bolt or other type of fastener in order to attach drawer rail assemblies to the panels, such as panels 82, 84, in a manner which is more fully described later in this description. In the most preferred, although non-limiting embodiment of the invention, the apertures, such as aperture 79, are formed along parallel axes, such as axes 81, 83 and such parallel lines or axes are equidistantly spaced along the surface of a panel, such as panel 82.

Figure 17:
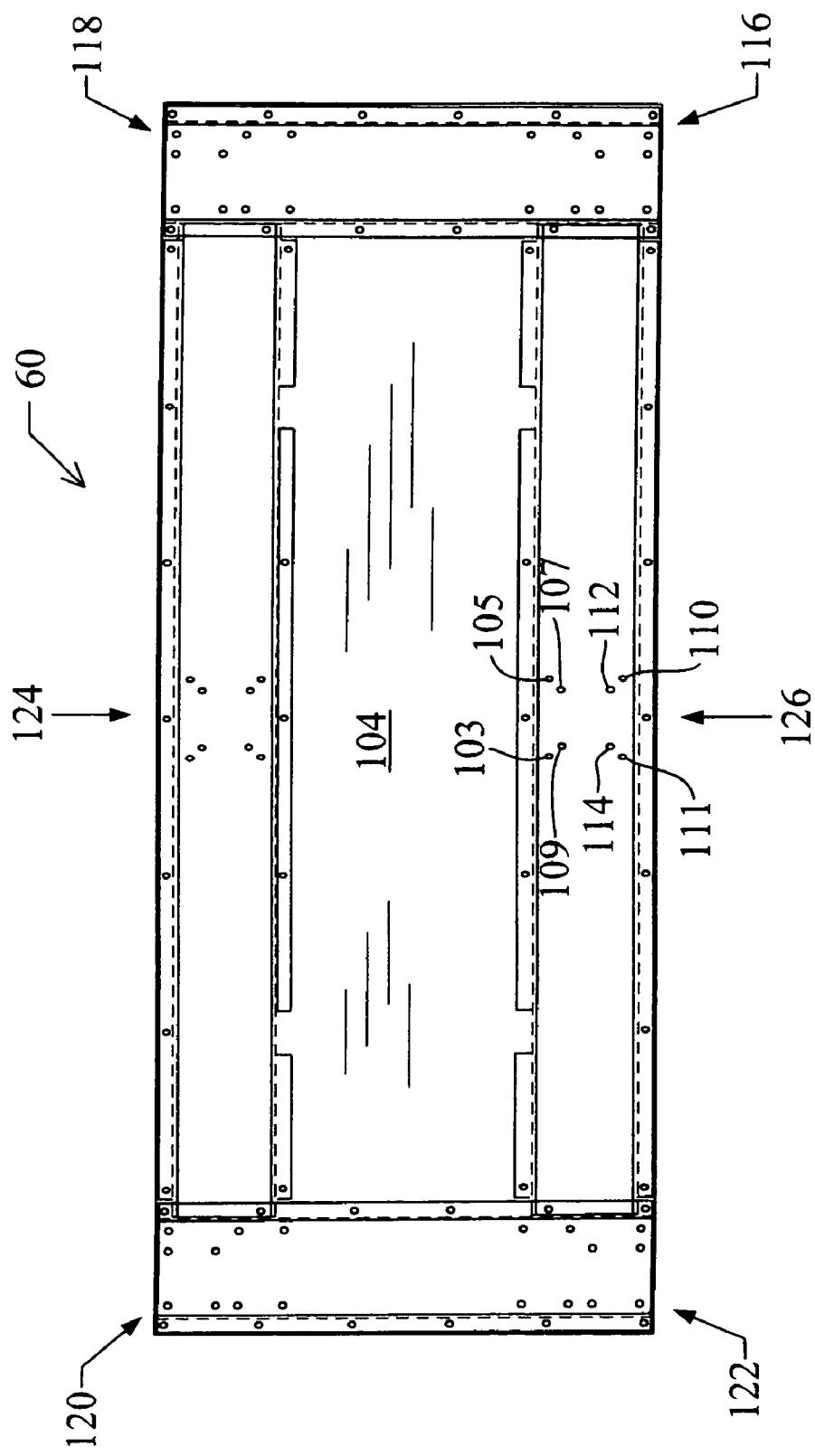
FIG. 17 is an unassembled bottom view of the toolbox assembly which is shown in FIGS. 1,2, and 16.
Figure 20:
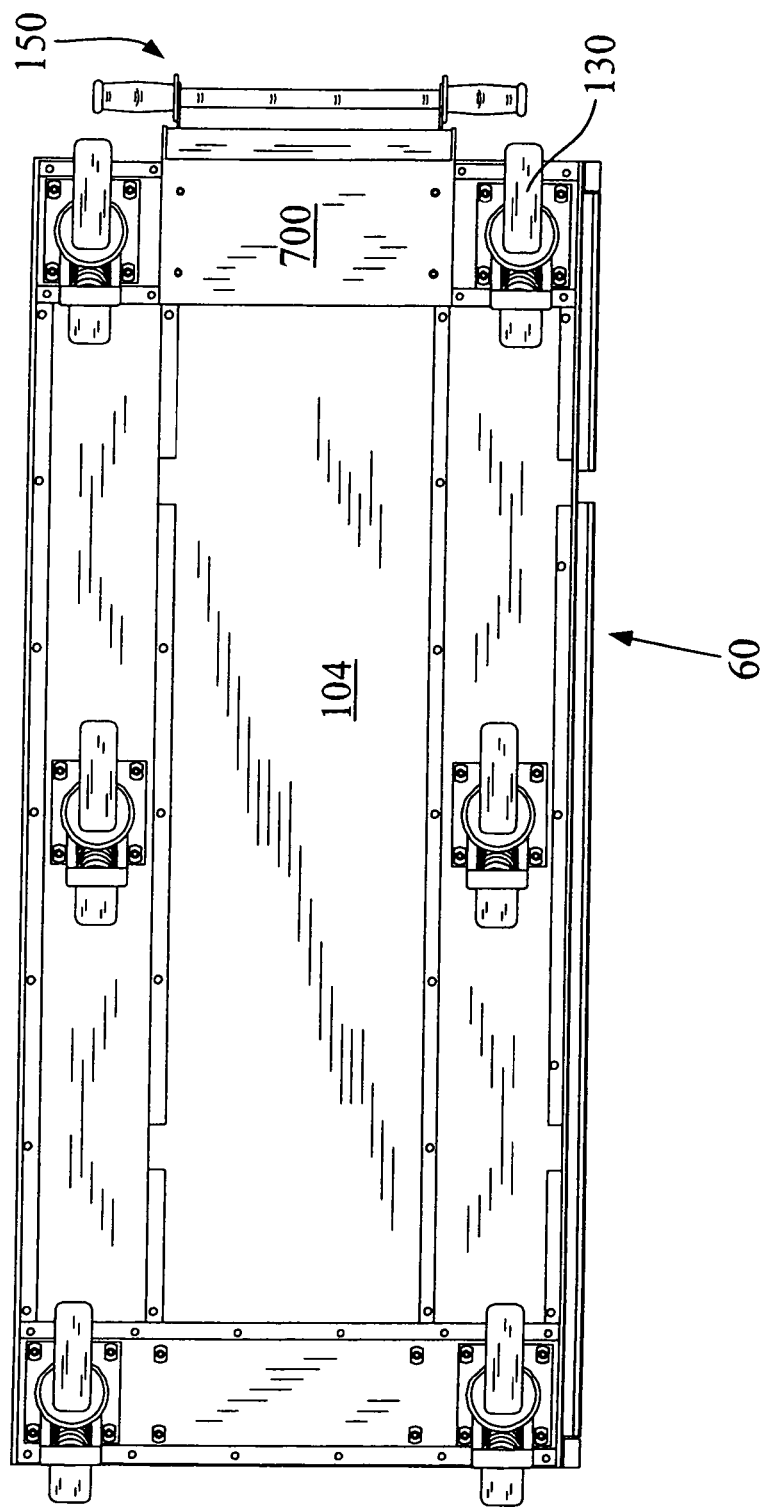
FIG. 20 is a bottom view of the toolbox assembly which is shown in FIGS. 1, 2, and 16.

In one non-limiting embodiment of the invention and as best shown in FIGS. 17 and 20, the bottom surface 104 of the member 60 includes a first group of apertures comprising a plurality of substantially identical apertures, such as apertures 110, 111, 112, and 114, and a second group of apertures comprising a plurality of substantially identical apertures 107, 109, 105, and 103, which are dissimilar, at least in size, to the first group of apertures. Importantly, the first and the second group of apertures are each distributed and are each resident at each of the corners 116, 118, 120, and 122 of the bottom surface 104 and in the middle portions 124, 126.

Each first group of apertures 110, 111, 112, and 114 are adapted to selectively and cooperatively receive a unique caster, such as caster 130, and, in the most preferred embodiment of the invention, each of the second group of apertures 103, 105, 107, 109 are larger than the apertures of the first group and are adapted to cooperatively receive a caster which is larger and more sturdy than caster 130. Thus, the foregoing arrangement allows differently sized casters to be selectively utilized at each of these corner and middle portion locations of the portion 60.

Thus, if it is desired to have relatively "heavy duty" or large casters utilized as part of the tool assembly 10, then such casters would be placed within the relatively large holes at each of these corner and middle portion locations (i.e., the second group of apertures 103, 105, 107, 109 would be utilized at each of these locations). Moreover, if relatively "light weight" casters are desired to be utilized, then such "light weight" or smaller casters are placed within the relatively small apertures (i.e., the first group of apertures 110, 111, 112, and 114) in each of these corner and middle portion locations. Thus, the bottom surface 104 is purposefully adapted to be able to accommodate a variety of dissimilar casters in order to allow the toolbox assembly 10 to be efficiently and easily "tailored" or programmed to the specific need of the user (e.g., if relatively heavy objects are to be stored within the toolbox assembly 10 and/or the toolbox assembly 10 will be used in a relatively harsh environment, then the relatively large casters may be selectively utilized as part of the toolbox assembly 10). Such casters may, of course, be easily replaced during use of the toolbox assembly 10. Further, it should be appreciated that other dissimilar groups of apertures may be utilized upon surface 60. The bottom surface 60 is thus "pre-configured" with different types/sizes of caster reception apertures.

As is best shown in FIGS. 1, 2, and 16, the toolbox assembly 10 further includes a handle portion 150 which may be selectively attached to the panel or partition 62, such as by the use of rivets or bolts 152, 154 and allows a user to conveniently maneuver the toolbox assembly 10 in a desired manner (e.g., in order to allow the toolbox assembly 10 to be efficiently moved and deployed to or at a desired location). Further, in the most preferred, although non-limiting embodiment of the invention, the panel 62 includes several apertures, such as apertures 160, 162, 164, 166, 168, and 170 and particularly, the aperture pairs 160,162; 166,170; and 164,168 may selectively and respectively receive the fasteners 152, 154 and in this manner the handle portion 150 may be selectively moved at a variety of "preformed" or "pre-designated" desired locations upon the panel 62 in order to suit the needs of individual users (e.g., it may be desired to place the handle 150 at the location defined by the apertures 160, 162, instead of the other aperture defined locations). Thus, each pair of apertures 160, 162; 166, 170; and 164, 168 cooperatively and respectively form a "predetermined" and potential location for the handle 150. Other numbers of "preprogrammed" or "preconfigured" locations may be utilized.

Further, as is shown perhaps best in FIGS. 16, 2, and 7, the toolbox assembly 10 includes a plurality of substantially identical rails, such as rails 190, 192 and each of these substantially identical rails, such as rails 190, 192, are deployed upon one of the side surfaces 193, 195 of the panel 84, upon surface 197 of panel 64, upon surfaces 199, 200 of panel 82, and upon surface 202 of panel 62. That is, each of the rails, such as rails 190, 192 are attached to a panel 84, 82, 64, 62 along a unique one of the respectively pre-formed line or axis, such as rail line 81 and are attached to a panel by the use of a bolt, rivet or other fastener which is through the apertures, such as aperture 901, which cooperatively form the line upon which the rail member resides.

Particularly, each of the substantially identical rails, such as rails 190, 192, respectively lies upon a unique axis or line, such as axis 205 or axes 81, 83, which are each parallel to the top surface member or portion 14 and which includes a first receptacle portion 207 which is coupled to the respective surface 193, 195, 197, 199, 200, and 202 and a respective second portion 210 which movably resides within the respective first receptacle portion 207 and which is coupled to a drawer, such as drawer 215 (e.g., to a unique side surface of a unique drawer, such as side surface 219 of drawer 217).

Particularly, the second portion 210 moves within (e.g., by the use of ball bearings or some other type of component to facilitate movement) the first portion 207 in a direction which is constrained to only occur along the respective axis formed by the apertures which allow the rail to be attached to the panel, such as panel 84, 82, 64, 62 to which it, is attached. In this manner, each second portion 210 is constrained to only move in a direction towards and away from the cavity 80.

In the preferred embodiment of the invention, each rail, such as rails 190, 192, which is placed upon surface 197 of panel 64 has a corresponding rail which is placed upon the surface 195 of panel 84. The term "corresponding rails", in this context, means that the two "corresponding rails" are linearly coextensive, substantially identical, and reside within the same plane which is parallel to the top surface 14. Similarly, each rail, such as rails 190, 192, which resides upon surface 193 of the panel 84 has a corresponding rail which is resident upon the surface 199 of the panel 82. Further, each rail, such as rail 190, 192, which resides upon the surface 200 of panel 82 has a corresponding rail which resides upon surface 202 of panel 62. The use of such rails in combination with utilized drawers will now be discussed. It should be realized that in another non-limiting embodiment of the invention, each first portion 207 may also be movably coupled or movably reside within toolbox 10 and constrained to move towards and away from the cavity 82. In this non-limiting embodiment, each first portion 207 resides within a track which is fixed to a side surface of a panel and which movably but securely contains the first portion.

As is perhaps best shown in FIGS. 1 and 16, the toolbox assembly 10 includes a plurality of drawers, such as drawers 215, 217 and each drawer, such as drawers 215, 217 respectively includes opposed side surfaces 219, 221 upon which a respective second rail portion 210 is operatively deployed. In this manner, each such drawer, such as drawers 215, 217, is movable from a respective first position, shown by drawer 215 in FIG. 16, in which the drawer is extended from the cavity 80 of the toolbox assembly 10 (e.g., by having the attached second rail portions 210 move in a direction away from the formed cavity 80), to a second position, shown by drawer 223 of FIG. 16, in which the side portions of the drawer wholly reside within the cavity 80 (e.g., by having the attached second rail portions 210 move back into the cavity 80). It should be appreciated that only when a drawer is extended from the cavity 80 may the contents of the extended drawer by accessed by a user of the toolbox assembly 10. It should further be appreciated that, in the most preferred, although non-limiting embodiment of this invention, the drawers 215, 217 may be interchanged (e.g., the second portions 210 of the drawer 215 may be placed upon the rail portions 207 which the second portions 210 of the drawer 217 resided upon, as shown in FIG. 16, and the second portions 210 of the drawer 217 may be placed upon the rail portions 207 which the second portions 210 of drawer 215 resided upon as shown in FIG. 16). Such drawer interchangeability allows for greater overall utility since some items which are frequently used and which fit well within a certain sized or certain "deep" drawer may be placed at substantially any desired location with respect to the toolbox assembly 10 (e.g., at the top, thereby allowing for easier access for frequently utilized items). That is, as shown, the storage or containment cavity of the drawer 215 is much more shallow than is the storage or containment cavity of the drawer 217.

Figure 10:
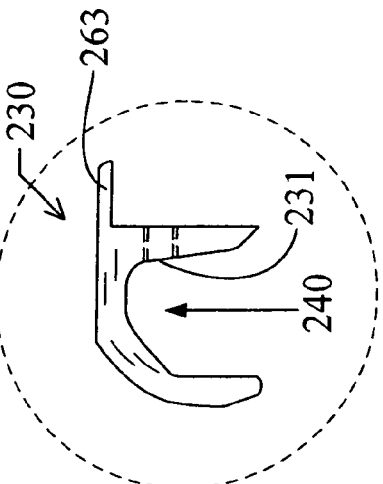
FIG. 10 is a partial exploded view of the trim portion of the door assembly which is shown in FIG. 9 and which is taken around the area which is labeled as "10" in FIG. 9.
Figure 11:
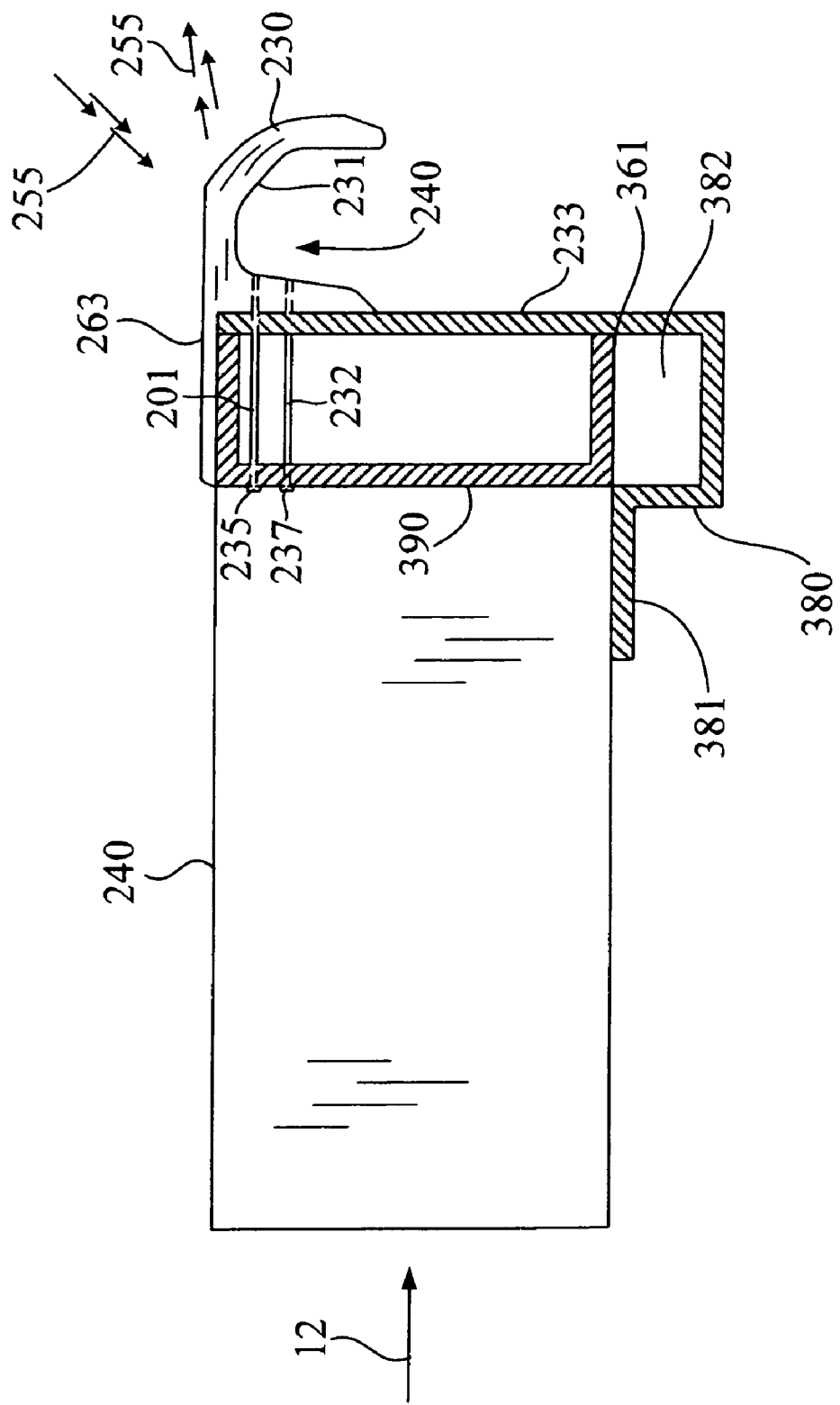
FIG. 11 is a side and partial sectional view of one of the drawers of the toolbox assembly which is shown in FIGS. 1 and 2.

In the most preferred, although non-limiting, embodiment of the invention, each of the drawers, such as drawers 215, 217 includes door trim 230 which is perhaps best shown in FIGS. 10, 11, and 16.

Particularly, the door trim 230 may be constructed from plastic or some other type of composite material and is fastened to a door by the use of two substantially identical mounting screws 201, 232 which have their respective heads 235, 237 located hidden from view and located within the drawer. Importantly, in the most preferred embodiment of the invention, the trim 230 has a first generally "U-shaped" portion 231 which abuts the front surface 233 of the drawer and further includes an interior portion of the "U-shape" 240 being directed toward the floor or other surface 250 upon which the toolbox assembly 10 resides (e.g., the interior portion 240 is accessible in a direction from surface 250). It should be appreciated that the interior portion 240 is a convenient place for a user to grasp a drawer, such as drawer 217, in order to selectively move a drawer, such as drawer 217, from a first stored position to an extended position and back to the stored position. Further, it should be appreciated that the "U-shaped" portion reflects light rays, such as light ray 255, which may impinge upon it, thereby creating an aesthetically pleasing overall appearance, especially when one views the front of the toolbox assembly 10 (i.e., the term "front" means the portion of the toolbox assembly 10 upon which the trim 230 is deployed).

Further, in the most preferred, although non-limiting, embodiment of the invention, the trim 230 includes a projecting portion 263 which integrally terminates into the "U-shaped" portion 231 and which abuts and is connected to the top surface 240 of a drawer, such as drawer 217. Such connection may be made by the use of a conventional fastener or a fastener adhesive or some other type of conventional fastener strategy or methodology.

Figure 9:
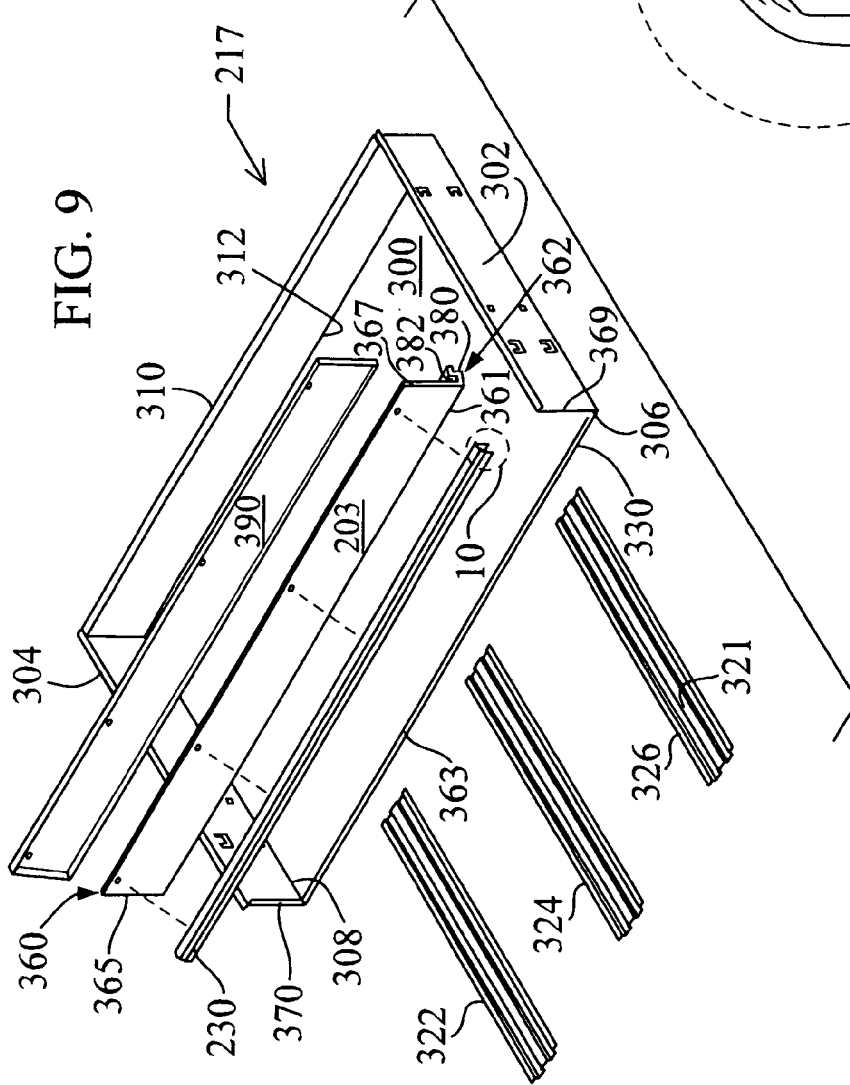
FIG. 9 is a perspective unassembled view of a drawer assembly of the toolbox assembly which is shown in FIGS. 1 and 2.

As is perhaps best shown in FIGS. 9 and 11, some or all of the utilized drawers, such a drawer 217, includes a substantially planar bottom shelf portion or member 300 which supports the stored items, substantially identical and generally planar side members 302, 304 which are orthogonally and respectively coupled along opposed edges 306, 308 to the member 300 (i.e., member 300 forms a respective right angle with respect to each member 302, 304), and a generally planar back member 310 which is orthogonally coupled to the bottom member 300 along edge 312 (i.e., member 300 forms right angle with respect to member 310). Such coupling may be achieved by adhesive or by the use of a welded connection or by some other connection methodology or strategy.

Further, some or all of the drawers, such as drawer 217, may further includes three substantially identical channel or trough members 322, 324, and 326 which, in one non-limiting embodiment are each substantially similar to member 24, are selectively attached to the surface 330 of the member 300 by the use of conventional fasteners, by adhesive, or by a welded connection or by substantially any other desired connection methodology or strategy and which enhances the structural integrity of the overall drawer and bottom member 330. In one non-limiting embodiment of the invention, the channel members 322, 324, and 326 are linearly coextensive and equidistantly spaced upon the bottom surface 330. While the shape of each of the channel members 322, 324, 326 may vary as desired, in the most preferred embodiment of the invention, the respective top surface 321 of each channel member 322, 324, 326 has an undulating surface geometry (i.e., a non-planar surface geometry) which promotes enhanced structural support.

In the most preferred, although non-limiting, embodiment of the invention and as best shown in FIGS. 9 and 11, some or all of the drawers, such as drawer 217, includes a front member 360 which has the generally planar surface 203 to which the trim 230 is attached. Further, the member 360 has an edge 361 which is attached to the edge 363 of the surface or member 300 and which has edges 365,367 which are respectively attached to edges 369, 370 and which allows the member 360 to cooperate with the members 302, 304, 300, and 310 to form a containment cavity. Further the member 360 includes a lip portion 362 which includes a generally "S-shaped" portion 380. Particularly, portion 380 has ledge 381 which receives and is coupled to the member 300 when the member 360 is coupled to the members 302, 304. The portion 380 further includes a trough 382. Some or all of the drawers, such as drawer 217, further includes a generally planar member 390 which is received into or which overlays the trough 382 and which attached to the member 360 by the use of fasteners, a welded connection, or any other type of connection strategy. In this manner, some or all of the drawers, such as drawer 217 therefore have a double wall construction (i.e., formed by members 390 and 360) without the use of exposed spot welds. Such a double wall construction makes for a relatively strong drawer which protects against puncturing or structural damage.

Figure 12:
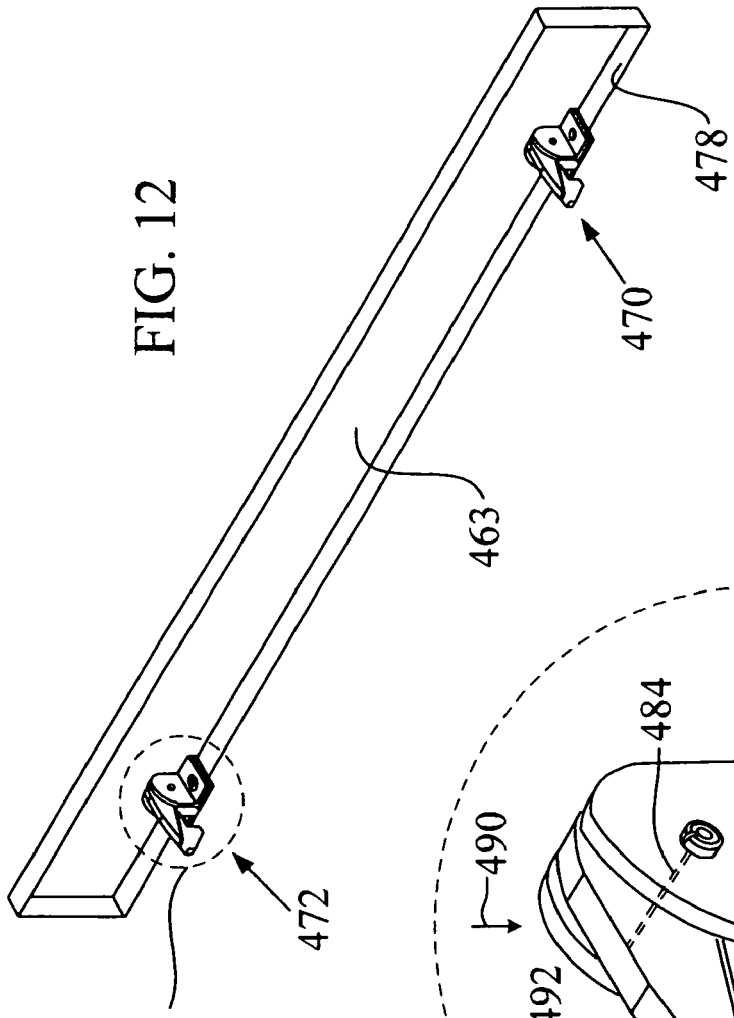
FIG. 12 is a perspective view of the back side of the drawer which is shown in FIG. 11 and which is taken along the direction shown by arrow 12 in FIG. 11.
Figure 13:
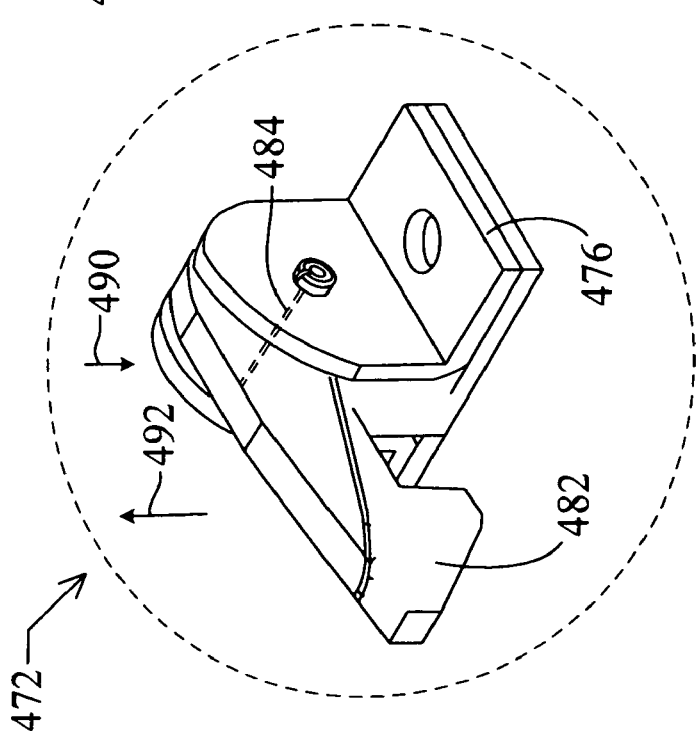
FIG. 13 is an exploded view of the door latch assembly which is shown in FIG. 12 and which is taken around the area which is labeled as "13" in FIG. 12.
Figure 15:
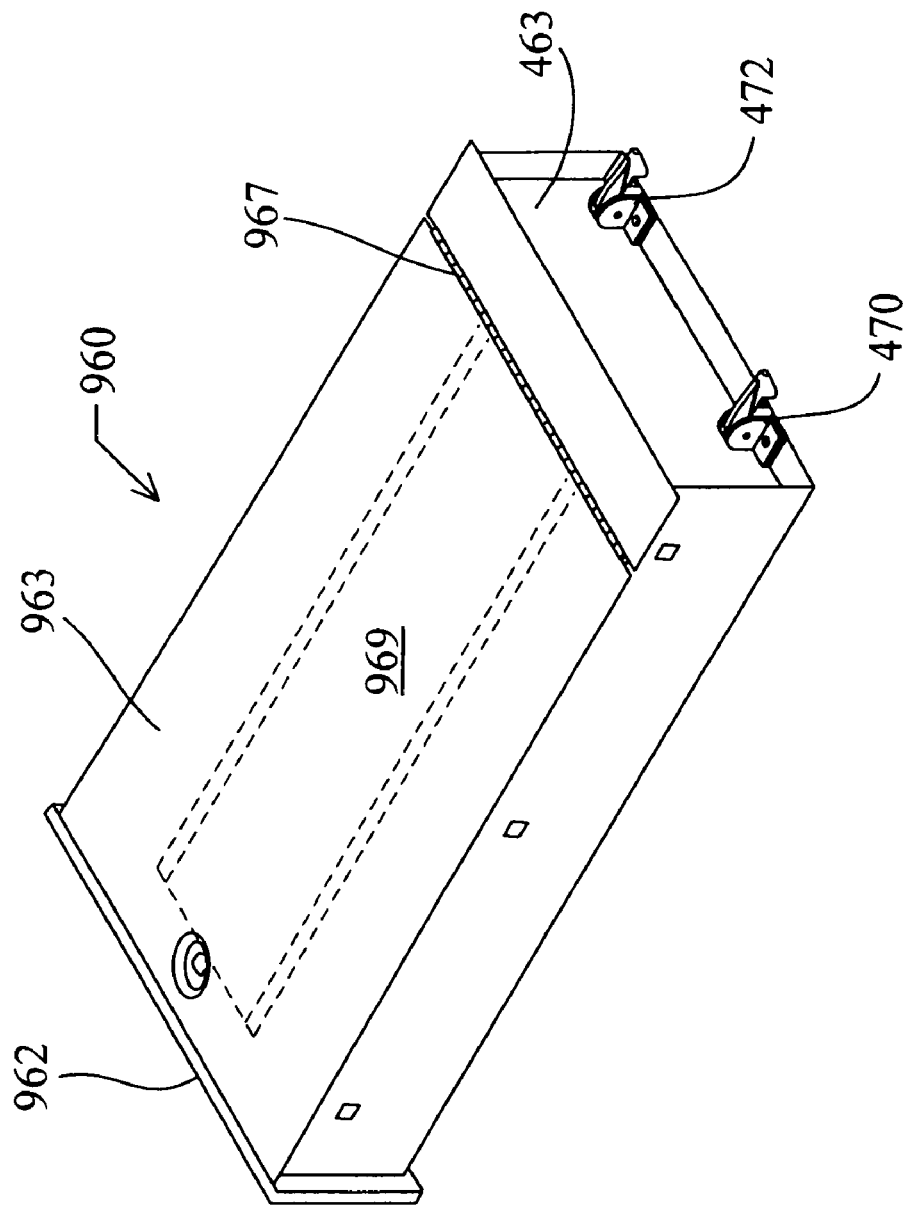
FIG. 15 is a perspective view of a drawer of the toolbox assembly which is shown in FIGS. 1 and 2.

As shown best in FIGS. 12, 13, and 15, each of the drawers, such as drawer 460, includes a front surface 462 which is typically the only portion of the drawer which is seen by those in the vicinity of the toolbox assembly 10 when the drawer 460 is selectively placed in a closed position, and an opposed back surface 463 which includes a flange or circumferential ledge 478 and which further includes a pair of substantially identical latch assemblies 470, 472. It should be appreciated that the circumferential ledge or lip 478 provides enhanced structural support to the drawer.

Particularly, each latch assembly 470, 472 includes a pair of generally "L-shaped" and substantially identical ends 476 which are each coupled to the lip portion 478 of the opposed back surface 463 by a conventional fastening methodology, such as by the use of a welded connection, and a selectively movable lever or "hook shaped" portion 482 which is coupled to each of the ends 476 by a spring containing pin 484 which traverses the lever portion 482, which is coupled to each end 476, which is substantially parallel to the plane wholly containing each end 476, and which allows the member 482 to move in the directions 490, 492, although the spring 484 biases the lever member 484 in a downward position (i.e., toward the floor or surface 250). The use of a latch assembly 472 in combination with a locking assembly will now be discussed in greater detail below. It should be realized that other types of selectively movable latching assemblies may be utilized.

Figure 8:
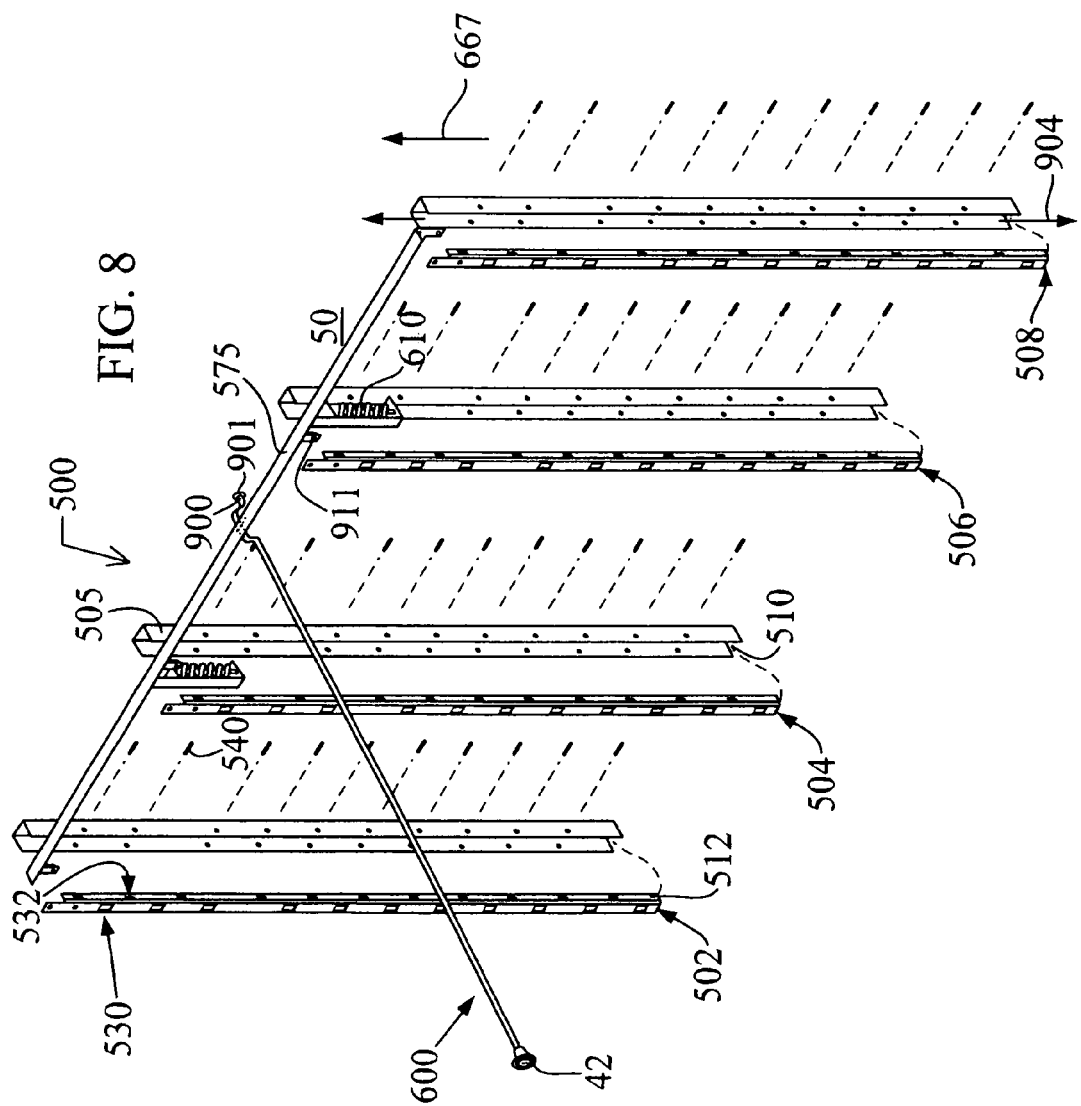
FIG. 8 is a partial perspective view of the locking assembly of the toolbox assembly which is shown in FIGS. 1 and 2.
Figure 14:
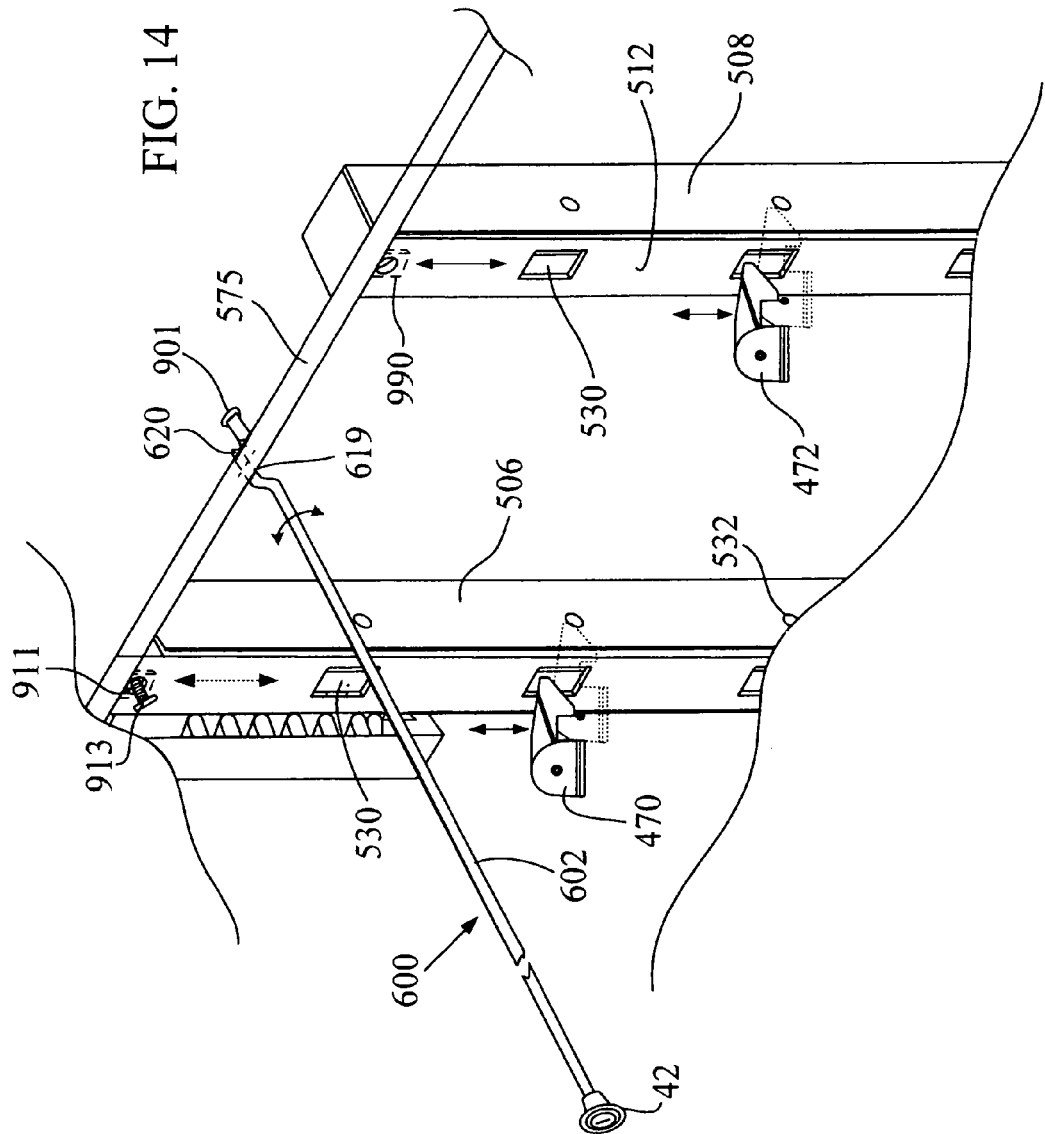
FIG. 14 is a partial perspective view of the back wall portion and locking assembly portions of the toolbox assembly which is shown in FIGS. 1 and 2.

Referring now to FIGS. 7, 8, and 14, there is shown a drawer locking assembly 500 which is deployed in the toolbox assembly 10 made in accordance with the most preferred embodiment of the invention.

As shown, in the most preferred, although non-limiting embodiment of the invention, upon the back wall member 50 there is deployed a plurality of substantially identical channel members 502, 504, 506, 508 and each such channel member 502-508 includes a fixed member 505 having a cavity 510 and a generally "L-shaped" locking portion 512 which is movably deployed over the cavity 510 and which is coupled to the member 505.

Particularly, a locking portion 512 includes a first plurality of openings 530 and a second plurality of openings 532. Each of the second plurality of openings 532 receive a pin 540 which traverses the member 505 to which that locking portion 512 is coupled and allows the locking portion 512 to be movably deployed over a channel member 502-508 (i.e., the second plurality of openings 532 each have a diameter which is larger than the diameter of the pins 540, thereby allowing the locking portion 512 to move along the longitudinal axis of symmetry 904 of the member 505 to which it is attached).

The drawer locking assembly 500 further includes a bar 575 which is movably coupled to the locking portions 512 (e.g., by the use of flanges 990 which contain an aperture 911 which receive fasteners 913 having a smaller diameter than the apertures 911, such fasteners 913 being connected to a unique one of the locking portions 512). The flanges 990 are integrally formed with the bar 575 or connected to the bar 575 by the use of a welded connection or some other type of connection. The drawer locking assembly 500 further includes a member 600 having a body portion 602 which terminates into the key lock assembly 42 (e.g., is coupled to the selectively movable tumbler portion 5 of the key lock assembly 42), and a second end portion 619 which is substantially "U-shaped" and which is movably coupled to the back wall portion 50. Such "movable coupling" may be achieved, in one non-limiting embodiment, by having end 900 of the bar 600 being received into a compressible portion 901, which is fixed to the backwall 50. The compressible ball or member 901 receives end 900 and allows end 900 to selectively rotate (clockwise and counterclockwise) within it. Alternatively, the end 900 is frictionally but movably received within an aperture formed within the backwall 50.

The drawer locking assembly further includes a plurality of springs 610 which are each respectively coupled to the bar portion 575 and to a unique locking portion 512. The plurality of springs 610 each exert an upward force (e.g., a force in the direction designated by arrow 667) against the locking portion 512 and the bar 575.

In operation, when it is desired to unlock the toolbox assembly 10 (i.e., to allow the movement of the drawers in the outward or extended direction away from cavity 80), the lock 42 is turned in a counterclockwise direction which causes the member 600 to similarly rotate in a counterclockwise direction (due to the movement of the tumble portion 5), which causes the trough portion 619 to receive the bar 575, thereby causing the bar 575 to be lowered in the general direction of the floor or surface 250. This lowering causes the members or portions 530 to be lowered. When in the selective lowered position, the lever members 472 may be freely moved out of the apertures 530 (i.e., when a drawer, such as drawer 217 is placed into the cavity 80, each of its latches 470, 472 respectively enter a unique aperture 530 of a unique portion 512).

When it is desired to lock the toolbox assembly 10, the lock portion 42 is selectively turned in a clockwise manner which causes the top portion 620 of the member 600 to engage the bar 575 (as is shown perhaps best in FIG. 14), thereby causing the bar member 575 to move in a direction opposed to the surface or floor 250 and causing the apertures 530 to be similarly positioned in an upward position, thereby preventing the lever assemblies 472 from being removed from these apertures 530 and thereby preventing the drawers from being placed in a selective extended position.

It should be appreciated, that because the lever members 472 are "spring loaded", that even if the bar 575 is raised in placed into a locked position, a previously open drawer may be closed (i.e., its lever member 472 may be forced into the previously raised aperture 507). It should further be appreciated that the springs 610 (i.e., the upward biasing force of the springs 610) allows the bar 575 to be easily raised and the drawers placed into a locked position (e.g., the upward bias of the spring assists with the locking of the tool assembly 10), allowing those of even low or moderate strength to lock the assembly 10.

In the most preferred, although non-limiting embodiment of the invention and as is perhaps best shown in FIGS. 18, 19 and 20, an additional support bracket 700 may be used to structurally support the toolbox assembly 10. Particularly, the additional support bracket 700 is attached to the surface 104 which is closest to the handle 150, although such a support bracket maybe deployed upon any convenient location of the toolbox assembly 10.

Further, as best shown in FIG. 15, some or all of the deployed drawers, such as drawer 960, may include a frontal portion 962 and a movable top 463 which is movably coupled along spring 467 and which covers cavity 469, thereby allowing the contents of the cavity to be selectively covered or opened.

It is to be understood that the present inventions are not limited to the exact construction or embodiment which has been delineated above, but that various changes and modifications may be made without departing from the spirit and the scope of the inventions as they are more fully delineated in the following claims.

The invention claimed is:

1. A toolbox assembly having a body; and at least one drawer which is movably disposed within said body and wherein said at least one drawer comprises a planar bottom member having four peripheral edges; a pair of planar side members which are respectively coupled and are respectively linearly coextensive to opposed first and second edges of said four peripheral edges of said planar bottom member and wherein a second of said pair of planar side members has a first edge which forms a right angle with a third of said four peripheral edges of said planar bottom member and wherein a second of said pair of planar side members has a first edge which forms a right angle with said third of said four peripheral edges of said planar bottom member and wherein a second of said pair of planar side members has a first edge which also forms a right angle which said third of said four peripheral edges of said planar bottom member; a planar back member which is coupled to a fourth of said four peripheral edges of said planar bottom member and which is coupled to said pair of said planar side members; a front member having a planar front surface and bottom edge which terminates into an "S" shaped lip portion, wherein said lip portion has a first portion which is linearly coextensive to and which orthogonally projects from said bottom edge of said front member, a second portion which is linearly coextensive to and which orthogonally projects from said first portion and which is parallel to said planar front surface of said front member, and a third portion which is linearly coextensive to and which orthogonally projects from said second portion and which is parallel to said first portion and wherein said first, second, and third portions cooperate with said planar front surface of said front member to form a trough which is linearly coextensive to said planar front surface of said front member and which is positioned between said planar front surface of said front member and said second portion, and wherein said planar front surface of said front member includes a pair of opposed side edges which are respectively coupled to said first edge of said first of said pair of planar side members and to said first edge of said second of said pair of planar side members, and wherein said planar bottom member overlays said third portion of said "S" shaped lip portion and is coupled to said third portion of said "S" shaped lip portion, thereby allowing said bottom members, said front member, said side members, and said back member to cooperatively form a storage cavity and wherein said at least one drawer further comprises a planar reinforcement member which overlays without entering said trough and which is coupled to a back surface of said planar front member which is opposite to said front surface of said planar front member and which is thereby disposed within said formed storage cavity; and wherein said at least one drawer further comprising a plurality of substantially identical channel members which are coupled to a first broad surface of said bottom member and wherein said third portion of said "S" shaped lip portion is also coupled to said first broad surface of said bottom member and wherein said third portion of said "S" shaped lip portion and said plurality of channel members are each outside of said formed storage cavity and wherein said plurality of channel members are equidistantly disposed upon said first broad surface, and wherein each of said channel members have respective undulating surfaces which are coupled to said first broad surface of said bottom member.

2. The toolbox assembly of claim 1 further comprising a trim member which is coupled to said planar front surface of said front member.

3. The toolbox assembly of claim 1 wherein said back member further includes a circumferential ledge which resides outside of said cooperatively formed cavity.

4. A toolbox assembly having a body; and at least one drawer which is movably disposed within said body and wherein said at least one drawer comprises a planar bottom member having four peripheral edges; a pair of planar side members which are respectively coupled and are respectively linearly coextensive to opposed first and second edges of said four peripheral edges of said planar bottom member and wherein a second of said pair of planar side members has a first edge which forms a right angle with a third of said four peripheral edges of said planar bottom member and wherein a second of said pair of planar side members has a first edge which forms a right angle with said third of said four peripheral edges of said planar bottom member and wherein a second of said pair of planar side members has a first edge which also forms a right angle which said third of said four peripheral edges of said planar bottom member; a planar back member which is coupled to a fourth of said four peripheral edges of said planar bottom member and which is coupled to said pair of said planar side members; a front member having a planar front surface and bottom edge which terminates into an "S" shaped lip portion, wherein said lip portion has a first portion which is linearly coextensive to and which orthogonally projects from said bottom edge of said front member, a second portion which is linearly coextensive to and which orthogonally projects from said first portion and which is parallel to said planar front surface of said front member, and a third portion which is linearly coextensive to and which orthogonally projects from said second portion and which is parallel to said first portion and wherein said first, second, and third portions cooperate with said planar front surface of said front member to form a trough which is linearly coextensive to said planar front surface of said front member and which is positioned between said planar front surface of said front member and said second portion, and wherein said planar front surface of said front member includes a pair of opposed side edges which are respectively coupled to said first edge of said first of said pair of planar side members and to said first edge of said second of said pair of planar side members, and wherein said planar bottom member overlays said third portion of said "S" shaped lip portion and is coupled to said third portion of said "S" shaped lip portion, thereby allowing said bottom members, said front member, said side members, and said back member to cooperatively form a storage cavity and wherein said at least one drawer further comprises a planar reinforcement member which is received within said trough and which is coupled to a back surface of said planar front member which is opposite to said front surface of said planar front member and which is thereby disposed within said formed storage cavity; and wherein said at least one drawer further comprising a plurality of substantially identical channel members which are coupled to a first broad surface of said bottom member and wherein said third portion of said "S" shaped lip portion is also coupled to said first broad surface of said bottom member and wherein said third portion of said "S" shaped lip portion and said plurality of channel members are each outside of said formed storage cavity and wherein said plurality of channel members are equidistantly disposed upon said first broad surface, and wherein each of said channel members have respective undulating surfaces which are coupled to said first broad surface of said bottom member.

5. The toolbox assembly of claim 4 further comprising a trim member which is coupled to said planar front surface of said front member.

6. The toolbox assembly of claim 5 wherein said back member further includes a circumferential ledge resides outside of said cooperatively formed cavity.

* * * * *